(12) United States Patent
Salessi et al.

(10) Patent No.: US 9,336,313 B1
(45) Date of Patent: *May 10, 2016

(54) SYSTEMS AND METHODS FOR PERFORMING SINGLE AND MULTI THREADED SEARCHES AND COMPLEX PATTERN MATCHING IN A SOLID STATE DRIVE

(71) Applicant: NxGn Data, Inc., Irvine, CA (US)

(72) Inventors: Nader Salessi, Laguna Niguel, CA (US); Joao Alcantara, Irvine, CA (US)

(73) Assignee: NxGn Data, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/145,050

(22) Filed: Dec. 31, 2013

Related U.S. Application Data

(63) Continuation-in-part of application No. 13/949,913, filed on Jul. 24, 2013, now Pat. No. 9,092,321, and a continuation-in-part of application No. 13/950,047, filed on Jul. 24, 2013, now Pat. No. 9,021,189, and a continuation-in-part of application No. 14/141,646, filed on Dec. 27, 2013.

(51) Int. Cl.
| | |
|---|---|
| *G06F 12/00* | (2006.01) |
| *G06F 13/00* | (2006.01) |
| *G06F 13/28* | (2006.01) |
| *G06F 17/30* | (2006.01) |
| *G06F 12/14* | (2006.01) |
| *G06F 3/06* | (2006.01) |
| *G06F 12/02* | (2006.01) |

(52) U.S. Cl.
CPC .......... *G06F 17/30864* (2013.01); *G06F 3/061* (2013.01); *G06F 3/0638* (2013.01); *G06F 3/0679* (2013.01); *G06F 12/0246* (2013.01); *G06F 12/1408* (2013.01); *G06F 2212/2022* (2013.01)

(58) Field of Classification Search
None
See application file for complete search history.

(56) References Cited

U.S. PATENT DOCUMENTS

| | | | |
|---|---|---|---|
| 5,226,169 A | 7/1993 | Gregor | |
| 5,313,613 A | 5/1994 | Gregor | |
| 6,145,069 A | 11/2000 | Dye | |
| 2002/0053003 A1* | 5/2002 | Brandin | 711/108 |
| 2007/0055831 A1 | 3/2007 | Beeston et al. | |
| 2008/0140932 A1 | 6/2008 | Flynn et al. | |
| 2008/0178025 A1* | 7/2008 | Hand et al. | 713/323 |
| 2009/0150646 A1* | 6/2009 | Allen et al. | 711/213 |
| 2010/0023682 A1* | 1/2010 | Lee et al. | 711/103 |

(Continued)

OTHER PUBLICATIONS

Data Structures, Edward M. Reingold and Wilfred J. Hansen, Little Brown & Co., 1983, pp. 1-5.

(Continued)

*Primary Examiner* — Yaima Rigol
(74) *Attorney, Agent, or Firm* — Kuta Intellectual Property Law, LLC; Christine M. Kuta

(57) ABSTRACT

System and methods for enhanced data processing and analysis in a storage device, such as a solid state drive (SSD) include an SSD having a data storage and a controller. The data storage stores a plurality of data sets. The controller has a pattern buffer and a data engine. The controller receives a query, processes the query to extract a pattern, loads the pattern into the pattern buffer, and accesses the data storage. The data engine searches a data subset from the data storage for instances of the pattern using a rolling window method. The controller generates a result from the search.

15 Claims, 12 Drawing Sheets

(56) References Cited

U.S. PATENT DOCUMENTS

| | | |
|---|---|---|
| 2011/0314235 A1 | 12/2011 | Kwon et al. |
| 2012/0054420 A1* | 3/2012 | Kang et al. ............... 711/103 |
| 2012/0072683 A1 | 3/2012 | Iliadis |
| 2012/0117348 A1 | 5/2012 | Triantafillou et al. |
| 2012/0218822 A1* | 8/2012 | Roohparvar ............ 365/185.17 |
| 2013/0036265 A1* | 2/2013 | Bert et al. ............... 711/113 |
| 2013/0198445 A1 | 8/2013 | Bando et al. |
| 2013/0275692 A1 | 10/2013 | Kwok |

OTHER PUBLICATIONS

Amendment filed in U.S. Appl. No. 14/141,646.
Notice of Allowability in U.S. Appl. No. 13/950,047.
Amendment in U.S. Appl. No. 13/950,047, mailed Feb. 13, 2015.

* cited by examiner

SYSTEMS AND METHODS FOR PERFORMING SINGLE AND MULTI THREADED SEARCHES AND COMPLEX PATTERN MATCHING IN A SOLID STATE DRIVE

BACKGROUND

Every day, several quintillion bytes of data may be created around the world. This data comes from everywhere: posts to social media sites, digital pictures and videos, purchase transaction records, bank transactions, sensors used to gather data and intelligence, like climate information, cell phone GPS signal, and many others. This type of data and its vast accumulation is often referred to as "big data." This vast amount of data eventually is stored and maintained in storage nodes, such like hard disk drives (HDD), solid-state storage drives (SSD), and the like, and these may reside on networks or on storage accessible via the Internet, which may be referred to as the "cloud." This stored data may also require processing, or be subject to operations, such as during a search, query, encryption/decryption, compression, decompression, and other processes. Typically, a processing device, such as a central processing unit (CPU), in a server performs operations on the data. The data is read from the storage node, processed by the CPU and the processed data is sent to the source of a request and typically, also stored back on the storage node. Standard storage nodes generally do not include computational resources to perform such operations on data stored in the storage node.

Moreover, standard storage node interfaces, such as Serial Advanced Technology Attachment (SATA), Fibre Channel, and Serial Attached SCSI (SAS), do not define commands to trigger the storage node to perform data operations in the storage node. Accordingly, operations are performed outside of the storage node, e.g., in a server CPU. To perform such an operation, a server uses standard read and write commands supported by existing storage node interfaces to move data from and to the storage node. Specifically, the server sends a standard read command to the storage node via a bus. The storage node then sends the stored data over the bus to the server, which typically holds the data in its main memory. The CPU of the server then performs operations on the data to produce a result. Depending on the type of operation, the server provides the result to a requesting source and/or stores the result on the storage node.

There are several disadvantages associated with this process of reading the data from the storage node, and processing the data within the server, and potentially storing the processed data back on the storage node. Because of these disadvantages, the process of performing data operations on the server is referred to as "costly" or "expensive" in terms of device performance and power consumption. Because the server is involved in every step of the process, this process occupies the CPU of the server, consumes power, blocks other user operations that otherwise could have been performed, and requires that the server contain a buffer, or a larger buffer than would otherwise be needed. The buffer is typically the main memory of the CPU, or dynamic random access memory (DRAM). This process also ties up the communication bus between the server and the storage node since data is sent from the storage node to the server and then back to the storage node. In other words, existing processes for searching and analyzing large distributed databases are time-consuming and use large amounts of resources such as CPU utilization, memory footprint, and energy. Finally, these processes prevent the storage node management system from performing more sophisticated optimizations.

In summary, typical operations like search (query), decryption, and data analysis are, in existing systems, performed on the local server's CPU. Search and processing are performed over the entire data residing in storage nodes (e.g., solid state drives (SSDs), hard disk drives (HDDs), etc. within the server. Data needs to be moved from the storage node into the CPU memory where it can then be processed. This is inefficient, e.g., slow, because a single server CPU, which may control a large collection of storage nodes, has relatively little processing power with which to process the large volume of data stored on the collection of storage nodes. Moreover, requiring the server's CPU to do this work makes inefficient use of energy as well, in part because a general-purpose CPU like a server CPU generally is not designed to perform operations such as searching efficiently, and in part because transferring data over a data bus and across the interface to the storage node requires a significant amount of power. Thus, there is a need for a system and method for more efficiently processing data stored on storage nodes.

SUMMARY

According to aspects of embodiments of the present invention, a system and method of providing enhanced data processing and analysis in a storage node, such as a solid state drive (SSD) is provided.

In a first embodiment, a solid-state drive has a data storage storing a plurality of data sets and a controller. The controller has a pattern buffer and a data engine. The controller receives a query, processes the query to extract a pattern, loads the pattern into the pattern buffer, and accesses the data storage. The data engine searches in a data subset from the data storage for instances of the pattern using a rolling window method. The controller generates a result from the search. In a first arrangement, the data storage is a non-volatile memory device. In a second arrangement, the data storage is a flash memory. By processing queries and performing searches in the solid-state drive, time is conserved in that data transfer to a host device is reduced to results data responsive to the query. Further, power is conserved in that the solid-state drive is typically a lower power device than the typical host sending the query.

In a second embodiment, the solid-state drive has a data storage storing a plurality of data sets and a controller where the controller has a pattern buffer and a data engine. In this embodiment, the pattern extracted from the received query is made up of a number of bytes. Further, the rolling window has a size, and the size of the rolling window is determined from the number of bytes in the pattern.

In a further alternative embodiment, the solid-state drive has a data storage storing a plurality of data sets and a controller where the controller has a pattern buffer and a data engine. The controller receives a query, processes the query to extract a pattern, loads the pattern into the pattern buffer, and accesses the data storage. The data engine searches in a data subset from the data storage for instances of the pattern using a rolling window method. The data engine positions a rolling window at a first data position in the data subset. The data engine compares the window with the pattern byte by byte until a determination about matching is made and then the data engine moves the window to a second data position in the data subset. In an alternative arrangement, the data engine establishes a table based on the pattern in the pattern buffer and the data engine uses the table in positioning the window in the data subset.

In another embodiment, the solid-state drive includes a controller that is configured to receive a plurality of queries and to search one data subset at a time against the plurality of queries. In an alternative arrangement, the controller is configured to receive a plurality of queries and to search a plurality of data subsets wherein each data subset is associated with one of the plurality of queries.

In another embodiment, the controller in the solid-state drive further includes a CPU, a plurality of pattern buffers and a plurality of data engines. Each data engine of the plurality of data engines is associated with one of the plurality of pattern buffers. The controller receives a plurality of queries, and the CPU is configured to process each of the plurality of queries to extract patterns, and to the load each extracted pattern into one of the plurality of pattern buffers. The data engines search data subsets using the pattern from its associated pattern buffer.

In another embodiment, a method of retrieving data from a solid state drive where the solid state drive has a data storage and a controller having a data engine and a pattern buffer includes the step of receiving a query. The solid state drive then stores a pattern derived from the query in the pattern buffer. The controller searches the partial data from the data storage using a rolling window. The controller then generates results from the searching. In a first arrangement, the pattern is made up of a plurality of bytes and the method includes setting a size of the rolling window from the number of bytes. In a second alternative arrangement, the pattern is made up of a plurality of characters and the method includes setting a size of the rolling window from the number of characters.

In an alternative embodiment, the method of retrieving data from a solid state drive includes the steps of positioning a rolling window at a first data position in partial data retrieved from a data storage in the solid state drive. The solid state drive then compares a pattern derived from a received query with data in the rolling window byte by byte until a determination about matching is made. The solid state drive then repositions the rolling window at a second position in the partial data. In a further alternative embodiment, the solid state drive establishes a table based on the pattern. The solid state drive enters search data into the table and positions the rolling window in the data under search using search data from the table. In a first alternative arrangement, the data storage stores a plurality of data sets and the partial data is a data subset. In a second alternative arrangement, the searching step further includes searching a plurality of data subsets.

In another embodiment, the solid state drive receives a plurality of queries and searches partial data from the data storage in response to the plurality of queries. The solid state drive then generates results from the searching.

In another embodiment, a method of retrieving data from a solid state drive where the solid state drive has a data storage and a controller having a data engine and a pattern buffer and a data buffer includes the step of receiving a query. The data storage stores a plurality of data sets. The solid state drive then stores a pattern derived from the query in the pattern buffer. The controller loads data subsets into the data buffer and searches the data subsets from the data storage using a rolling window. The controller then generates results from the searching.

The present invention together with the above and other advantages may best be understood from the following detailed description of the embodiments of the invention illustrated in the drawings, wherein:

DRAWINGS

DESCRIPTION

The detailed description set forth below in connection with the appended drawings is intended as a description of exemplary embodiments of a system and method for performing efficient data operations and analytics provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The present disclosure relates to systems and methods for processing data in large systems using solid state storage. According to an embodiment of the present invention, processing of data stored on a solid state storage node, which may be referred to as a solid state drive (SSD) does not require comparatively slow reading and re-writing of the data and, instead, is accommodated by performing the processing within the SSD.

Conventional SSDs typically include a controller for facilitating the transfer of data to and from the SSD. The CPU in a typical SSD has limited processing capability, which is an obstacle, for example to running an operating system and to running Java. It also lacks a hardware engine for performing a word count or pattern matching.

Figure 1:
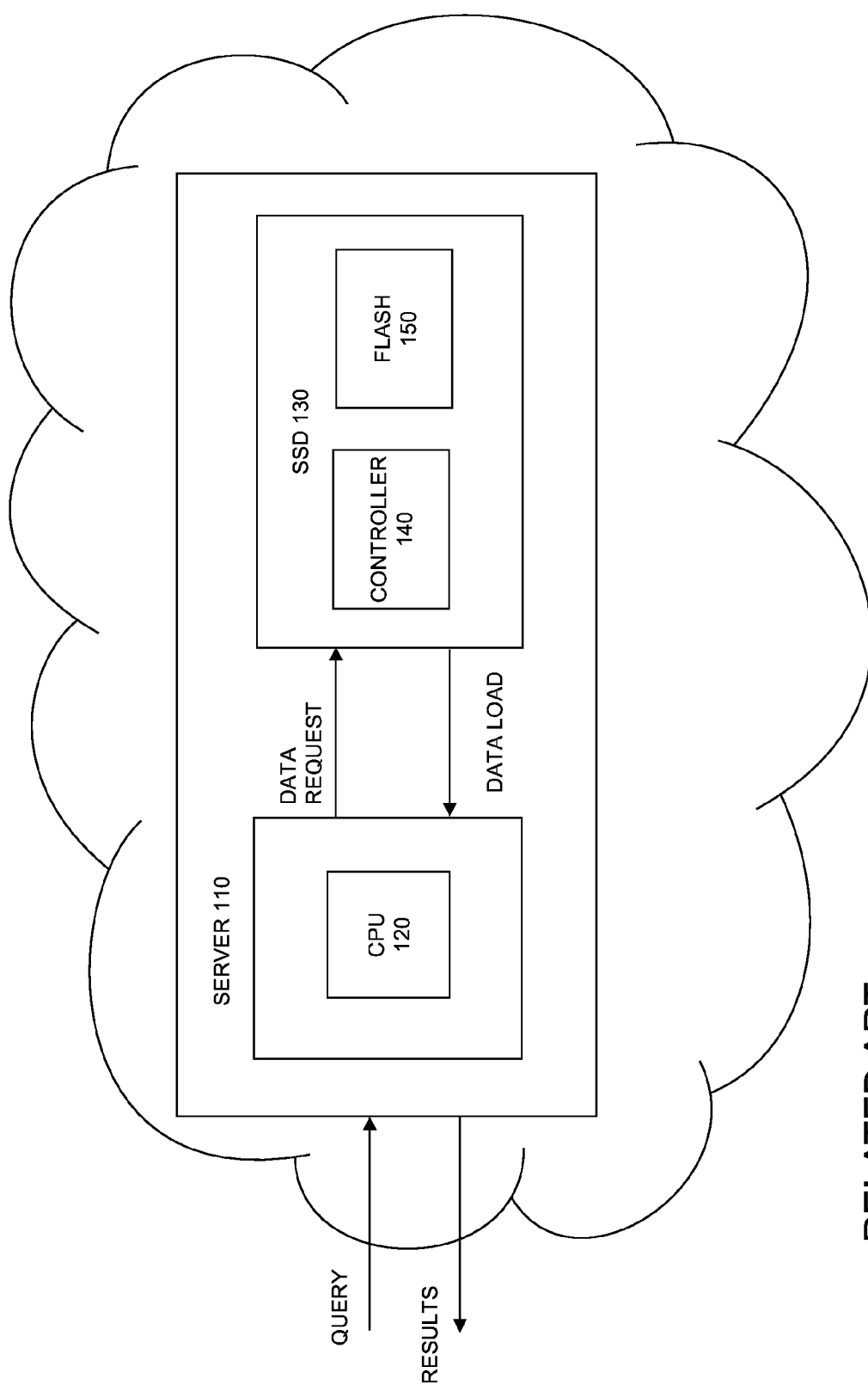
FIG. 1 shows an exemplary block diagram depicting a solid state drive in communication with a server, in accordance with related art systems.

FIG. 1 is a block diagram of a system which includes a server 110 in communication with a storage node for performing data queries according to prior art implementations. FIG. 1 includes a server 110, which can include a processor, such as a server central processing unit (CPU) 120, and an SSD 130, which can include a storage node controller 140 and a flash memory 150. The server 110 and SSD 130 may be implemented in a cloud-based computing environment. The server 110 and SSD 130 may communicate using any storage buses as well as PCIe with any protocol which runs on it. In other embodiments storage nodes may be connected to, and controlled by, a host CPU which need not be a server CPU but may be a CPU in an application not configured as a server. Thus a server CPU may be an example of a host CPU.

As used herein, the phrase "in communication with" refers to direct communication with or in indirect communication with via one or more components named or unnamed herein. The server 110 and the SSD 130 can be in communication with each other via a wired or wireless connection. For example, in one embodiment, the SSD 130 may comprise pins (or a socket) to mate with a corresponding socket (or pins) on the server 110 to establish an electrical and physical connection. In another embodiment, the SSD 130 can comprise a wireless transceiver to place the server 110 and the SSD 130 in wireless communication with each other. The server 110 and the SSD 130 may be separately housed from each other, or contained in the same housing.

As shown in FIG. 1, in operation, the server 110 may receive a query, which may, for example, entail finding the number of occurrences of a certain pattern or text. As used herein, a pattern is a combination of strings and logical operations, in which the logical operations determine which combinations of the strings, if they are found in a set of data, will constitute a match for the pattern in the set of data. In response, the server 110 may send a data request to the SSD 130. The SSD 130 receives the data request, and retrieves the requested data. The SSD 130 then sends the data to the server 110. The server CPU 120 processes the data and returns the results. The server 110 and the SSD 130 may include additional components, which are not shown in FIG. 1 to simplify the drawing.

Figure 2:
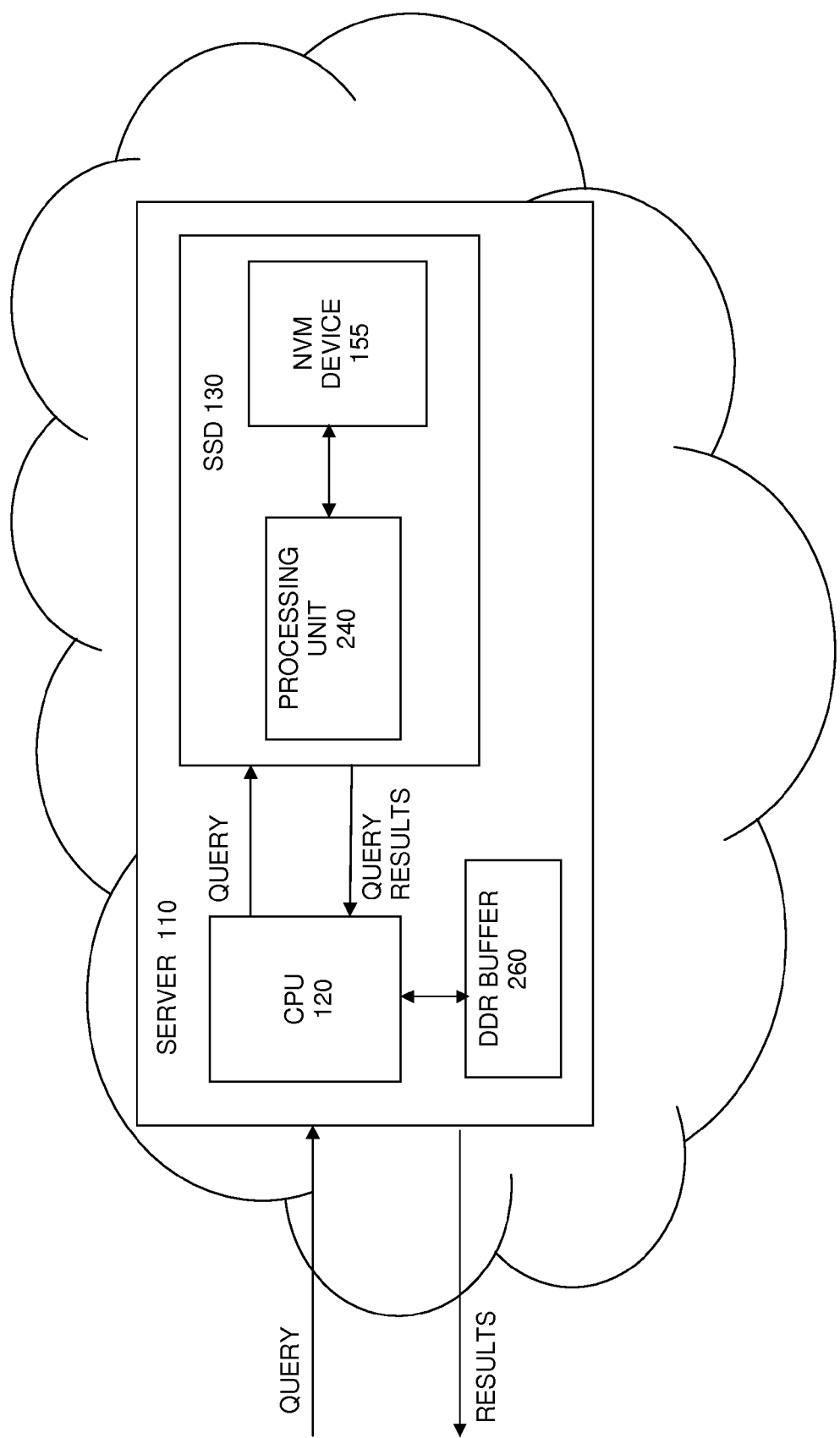
FIG. 2 depicts an exemplary block diagram of a solid state drive in communication with a server, in accordance with an embodiment of the present disclosure.

FIG. 2 is a block diagram of a system which includes a server 110 containing, and in communication with, an SSD 130 for performing data queries according to aspects of the present disclosure. The server 110 and SSD 130 may be part of a cloud-based computing environment, a network, or a separate subsystem. The server may also contain a server CPU 120, and a DDR buffer 260, which may be composed of DDR memory.

According to aspects of the present disclosure, the SSD 130 includes an SSD processing unit 240 that is designed for data operations or analytics, such as search and analysis of a large volume of unstructured data. The SSD processing unit 240 can include, for example, a reconfigurable digital signal processing (DSP) core containing arithmetic and logic units and other dedicated hardware units that may be used to perform data analytics, and other operations such as pattern matching, word count, average, mean value, compression, decompression, encryption, and decryption. In one embodiment, the SSD 130 includes a CPU. These additional cores and circuitry within the silicon of the SSD processing unit 240 occupy a small area and as a result consume little power. Although these functions could also be performed on a server CPU, such a CPU, being a general purpose CPU, will generally consume significantly more power. Moreover, transferring data over a data bus and across the interface to the storage node requires a significant amount of power. By designing and/or integrating the silicon of the SSD processing unit 240 to perform the desired functions, their execution can be made significantly more power-efficient. The SSD 130 may include an SSD processing unit 240 and a nonvolatile memory device (NVM device) 155.

In one embodiment, the SSD processing unit 240 performs querying of data. For example, a query may consist of a request to find a text word, and/or the number of occurrences of that text word in the storage nodes in the server. According to aspects of the present disclosure, instead of reading the entire contents of the storage node into the server CPU and counting the number of matches, the task can be computed locally within the storage node. The server 110 may be configured to receive queries. When the server (also referred to as the data node) receives a query, the server passes the query to the storage nodes in the server. Each of these storage nodes, which may be SSDs, may then process the query and return the results to the server, which may compile them. While this process is illustrated with reference to a query, a similar process enables data analytics, decryption, and other such operations to be performed on the SSD processing unit 240.

A query may include pattern matching, word count or occurrence counting. In both pattern matching and occurrence counting the data are searched for matches to one or more specified patterns; in pattern matching, the matching data are returned whereas in occurrence counting only the number of matches is returned. In addition to pattern matching, word count, and occurrence count, the SSD processing unit 240 may run a Java engine. The ability to run a Java engine on the SSD processing unit 240 may enable the SSD processing unit to perform sophisticated analysis of historical data, and also to run advanced algorithms for predictive analysis. It may also enable the storage node to perform more complex operations in response to communications supported by standard storage node interfaces. The ability to run Java requires a high performance CPU and also requires an operating system. The unused portion of the SSD processing unit 240 may be used for running the operating system and Java for high level operation. Other operations, such as counting the number of occurrences of a string in the SSD data, for which high speed execution at low power consumption is important, may be performed by purpose-designed processing elements or by a DSP core in the SSD processing unit 240.

Figure 3:
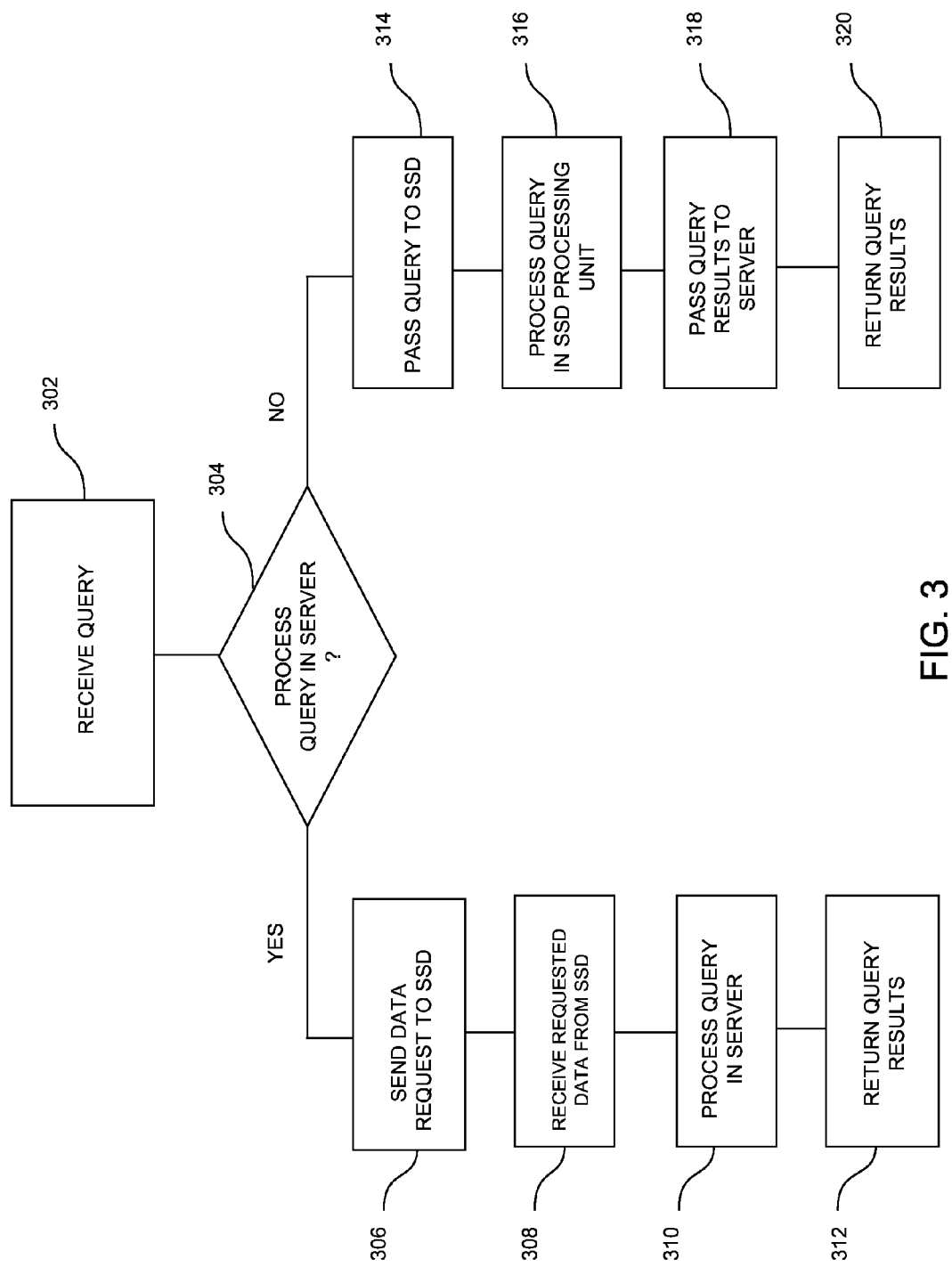
FIG. 3 shows exemplary acts for performing queries in a solid state drive, in accordance with an embodiment of the present disclosure.

FIG. 3 illustrates a flow diagram of an exemplary method for performing data queries according to aspects of the present disclosure. Specifically, the system of FIG. 2 receives a query 302 for data. At act 304, the server determines whether the query will be processed in the server or whether it will be passed to the SSD. If the system performs the query in the server, then at act 306, the server sends a data request to the SSD. The server receives the requested data from the SSD at act 308 and processes the query in the server at act 310. Finally, the server returns the query results at act 312.

If the system performs the query in the SSD, then at act 314, the server passes the query to the SSD. The SSD processes the query at act 316 and passes the query results to the server at act 318. Finally, the server returns the query results at act 320. While this process is illustrated with reference to a query, a similar process enables data analytics, decryption, pattern matching and searching, and other such operations to be performed on the SSD processing unit 240.

Figure 4:
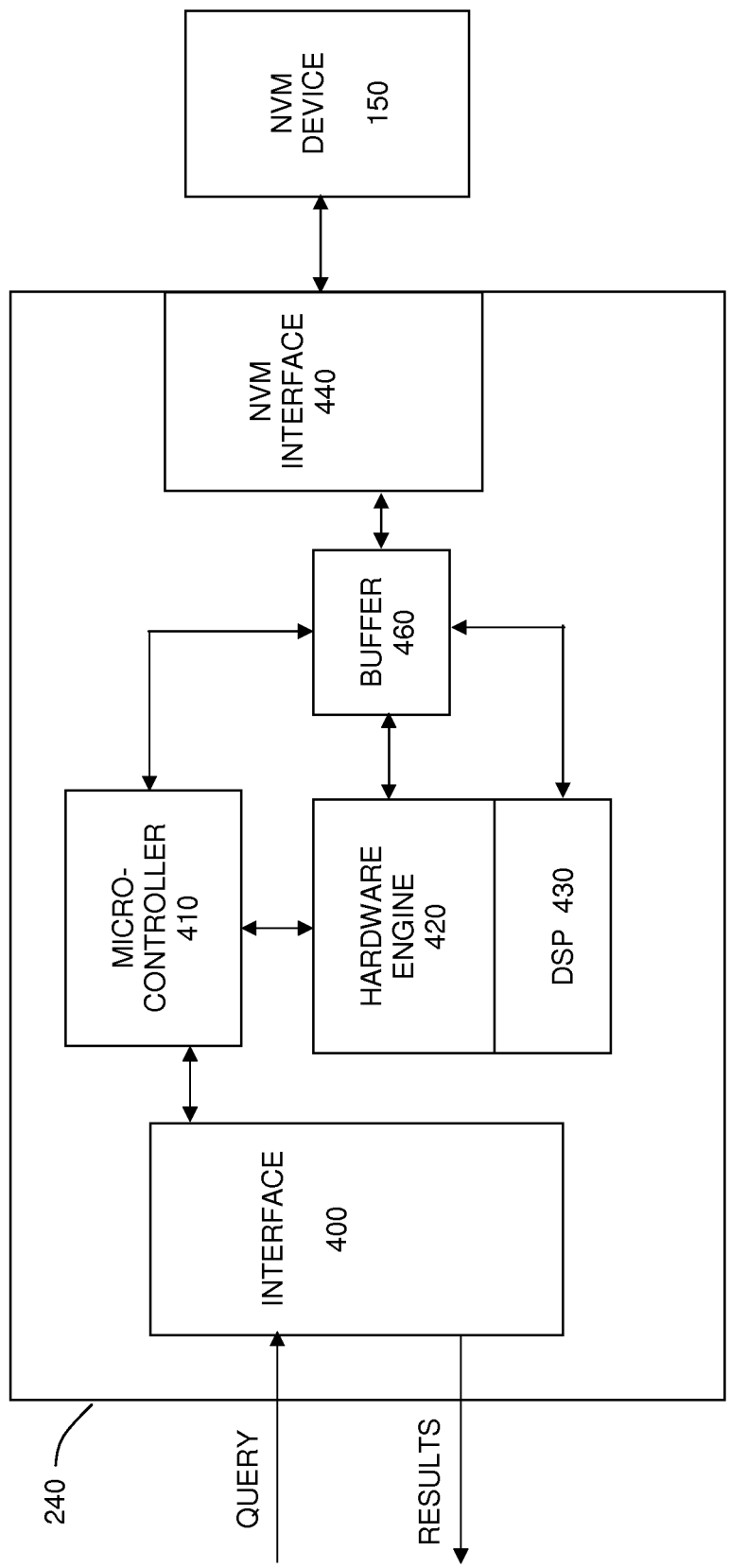
FIG. 4 depicts an exemplary block diagram of a processing unit of a solid state drive in communication with a server and flash memory storage, in accordance with an embodiment of the present disclosure.

FIG. 4 is a block diagram of an SSD processing unit 240 according to an embodiment of the present invention. The SSD processing unit 240 includes a host interface 400, a microcontroller 410, a hardware engine 420, a digital signal processor (DSP) or DSP core 430, a processing unit buffer 460, and a non-volatile memory (NVM) interface 440. The host interface 400 may be, for example, NVMe, SATA, Fibre Channel, SAS, SCSI over PCIe, or Ethernet. There may be other components on the SSD processing unit 240 which are not illustrated, such as buffers and the like. The SSD processing unit 240 communicates with the NVM device 155 through the NVM interface 440, which may implement a flash channel interface. In one embodiment, there may be a separate hardware engine 420 for each flash channel; the hardware engine 420 may include a hardware-based search engine. As used herein, a search engine is a digital hardware block designed to test a set of data to determine whether and where it contains matches to a specified pattern. Thus, a comparator implemented in hardware is an example of a search engine, and a more complex search engine may include, among its functional elements, a comparator implemented in hardware. The SSD processing unit 240 may be a single silicon chip, e.g., a system on a chip (SOC). In one embodiment, the DSP core is a reconfigurable DSP. In one embodiment, the microcontroller 410, the processing unit buffer 460, and the NVM interface 440 are all integrated onto a single semiconductor chip (e.g., a single silicon chip), along with a hardware engine 420 or a DSP core 430, or both.

As shown in FIG. 4, the SSD processing unit 240 may receive a query through the host interface 400. In one embodiment, the microcontroller 410 processes the query by using the hardware engine 420 to compare the requested content of the query with the data on the NVM device 155. The hardware engine 420 may be a hardware-based search engine and may work in conjunction with the DSP 430. In one example the DSP may perform encryption and decryption and the hardware engine may perform searching. The microcontroller 410 returns the results of the query to the server 110 through the host interface 400. In other embodiments, the results of the query or other operation in the SSD 130 may, instead of being returned to the server CPU 120 or host CPU, be stored in the NVM 155 or NVM devices 155 (FIG. 7), for subsequent retrieval by the server CPU or host CPU.

Figure 5:
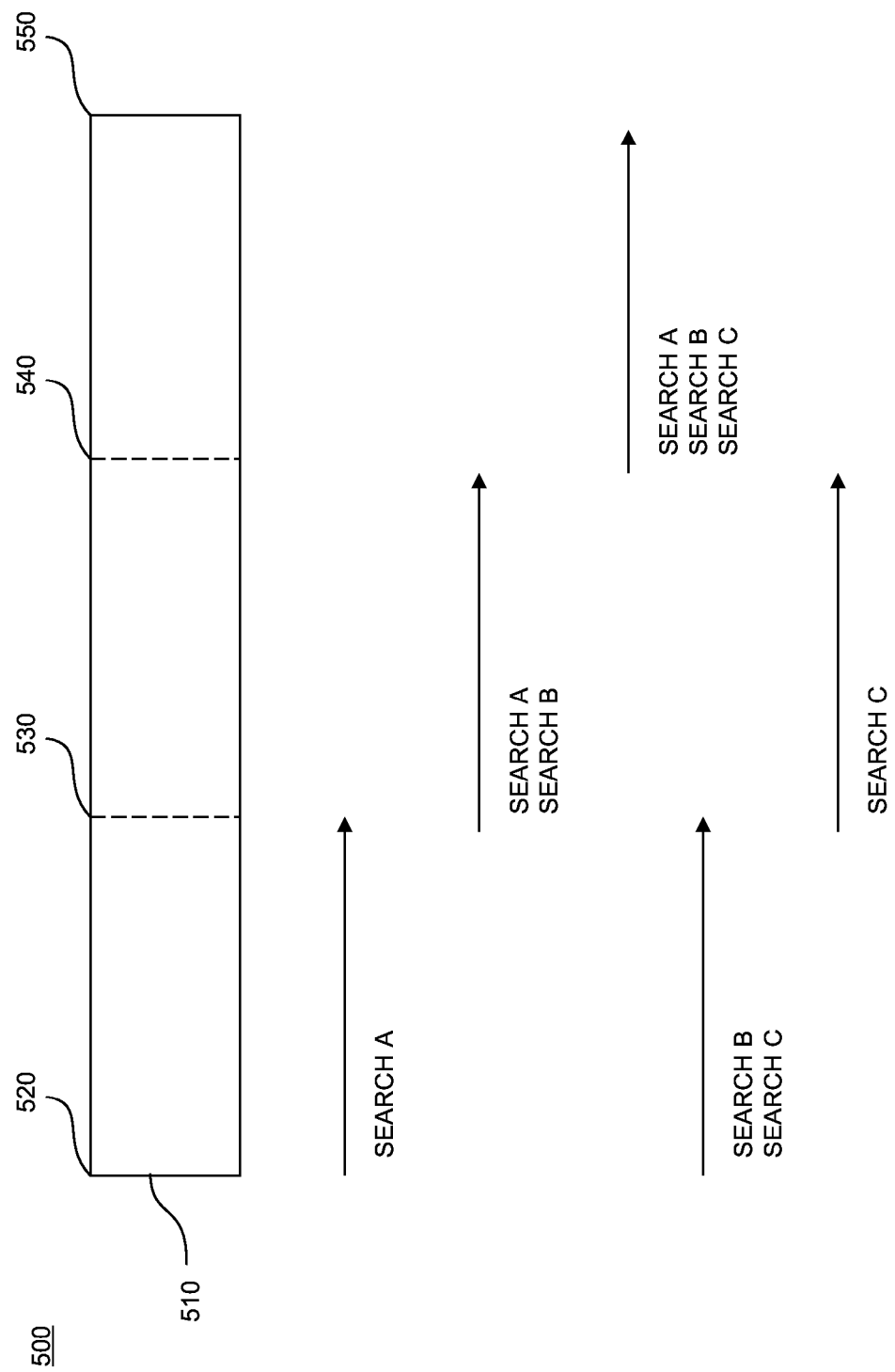
FIG. 5 shows a representation of the storage area of a solid state drive, in relation with searches conducted on the storage area, in accordance with an embodiment of the present disclosure.

FIG. 5 shows a representation of the storage area of an SSD 130, in relation with search processes conducted on the storage area, in accordance with an embodiment of the present disclosure. FIG. 5 includes a data storage area 510, which reflects the storage area on the NVM device 155 where data may be located. The server 110 may send queries regularly based on requests it may receive. Once a query, e.g., a request to search for occurrences of a first pattern, is passed to the SSD 130, the SSD 130 begins processing it, searching the NVM device 155. If an additional query, related to a second pattern, arrives before the SSD 130 has completed processing of the initial query, the SSD 130 may continue to search for the first pattern while simultaneously or concurrently beginning to search for the second pattern. Once it reaches the end of the NVM device 155, the SSD may then start again at the beginning of the NVM device 155, searching for only the second pattern, until it reaches the point in the NVM device 155 at which it received the second query. In a multi-threaded environment, the controller begins processing the second query when the query is received.

A wide range of capabilities may be implemented in a system constructed according to the embodiment illustrated in FIG. 4. For example, if the hardware engine 420 includes a hardware-based search engine, the system may be capable of high-speed, power-efficient searches of the NVM device 155, for example to count the number of occurrences of a string, pattern, or number. The DSP 430 may be used for functions such as encryption of the data written to the NVM device 155 and decryption of the data read from the NVM device 155, or similarly for compression and decompression at write and read respectively, to increase the effective storage capacity of the SSD 130. In one embodiment an application layer, running for example in the server CPU 120, may perform encryption or compression, and the DSP 430 may decrypt or decompress the data as needed based on the algorithm used in the application layer. The algorithm used by the application layer may be communicated to the DSP by the host CPU. A DSP may also be used for other functions such as in-line indexing, which may be performed when data is written to the NVM device 155, producing an index which may subsequently be used to accelerate search operations of the NVM device 155.

In one embodiment, the SSD 130 may perform sophisticated analysis including searches and conditional searches. For example, a server may have stored in it a very large number of e-mail messages, and a user may wish to find messages satisfying certain criteria, having been sent by a particular sender to any recipient at a particular company. The combination of these two criteria may be tested for by a suitably selected pattern, but if the user wishes to narrow the search further, e.g. with an intelligent search of the body of each e-mail to determine whether a particular transaction was discussed, a more sophisticated algorithm than pattern matching may be required. A conditional search may be used in this example, where criteria related to the body of an e-mail are tested only if an e-mail first meets a first set of criteria, e.g., related to the header of the e-mail; in this case, additional criteria, e.g., a second or third set of criteria related to the body of the e-mail may be added to the search. A system constructed according to the embodiment illustrated in FIG. 4 is suitable for implementing a broad class of analysis algorithms including searches and conditional searches.

In another example as illustrated in FIG. 5, upon receipt of query requiring a first search, referred to as Search A, the process begins reading the data storage area 510 at a storage location 520 and progresses through the data storage area 510. During Search A, while at a storage location 530, a query requiring a second search, referred to as Search B, is received, and the process begins Search B at storage location 530, in addition to continuing Search A at storage location 530. Similarly, Search C is added to the set of simultaneously conducted searches at storage location 540. Search A completes at storage location 550, while Search B and Search C continue at storage location 520. Search B then completes at storage location 530, and Search C completes at storage location 540.

As illustrated in FIG. 5, the search process continues previously initiated searches across the data storage area 510, while simultaneously commencing newly requested searches. The data storage area 510 may be comprised of logical or physical addresses. The addresses may be defined as blocks, pages, sectors, or the like.

Figure 6:
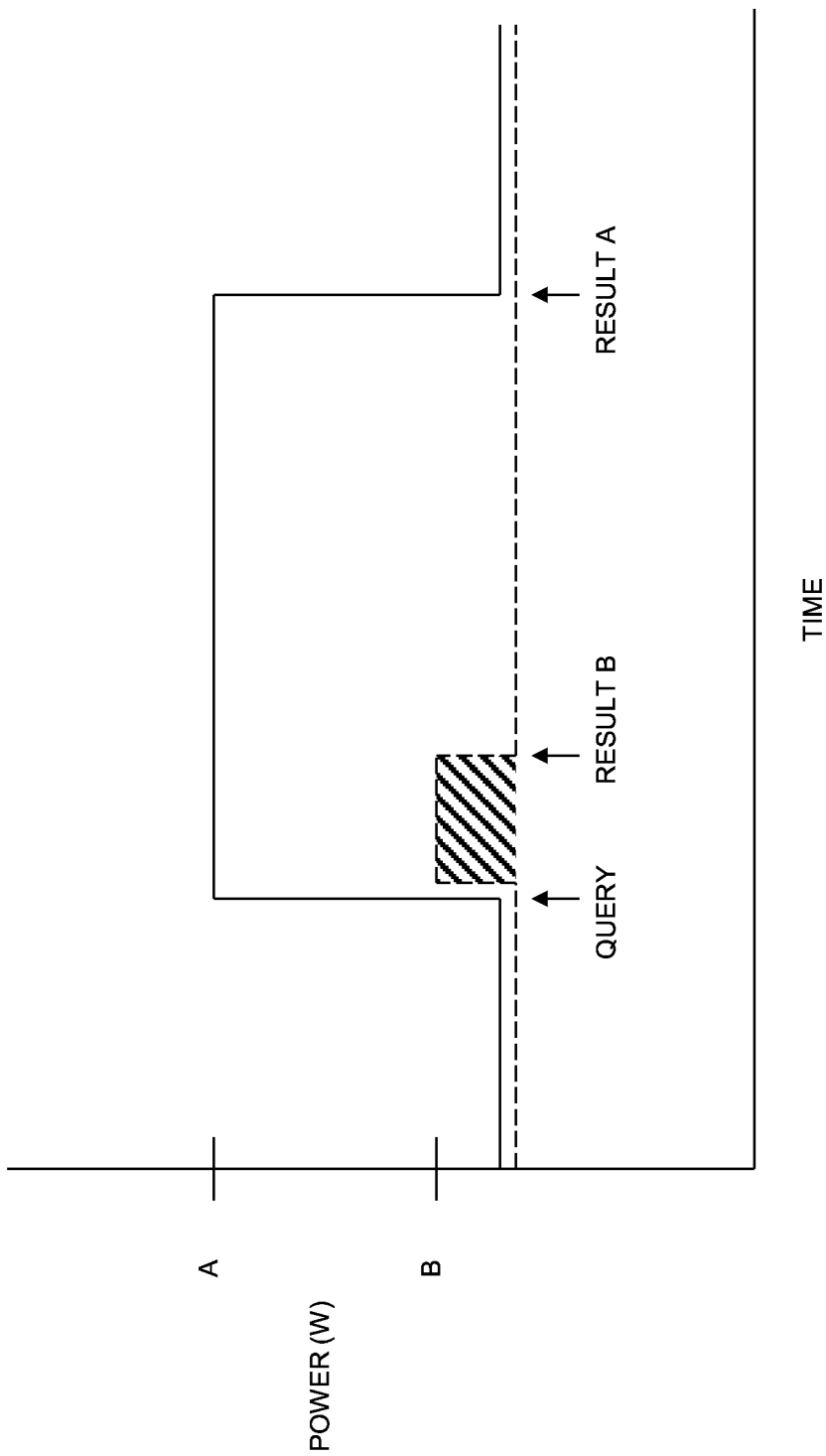
FIG. 6 shows a chart comparing the power usage of an existing system with the power usage of a system employing a storage node constructed according to an embodiment of the present invention, during an exemplary query of a solid state drive.

FIG. 6 shows a chart of the power usage of existing systems in relation to the power usage of a system constructed according to an embodiment of the present invention, for an exemplary query of a solid state device. The solid line depicts typical power usage when a server processes a query. The dotted line depicts typical power usage when the query is instead performed by the solid state device 130. Because the server CPU both consumes a higher level of power (level A in FIG. 6) and spends more time processing the query, the energy consumed, i.e., the area under the solid line, is significantly greater than the energy consumed (represented by the cross-hatched area under the dashed line) when the query is processed by the SSD 130, which consumes power at a lower level (level B in FIG. 6) and completes the processing more quickly.

Figure 7:
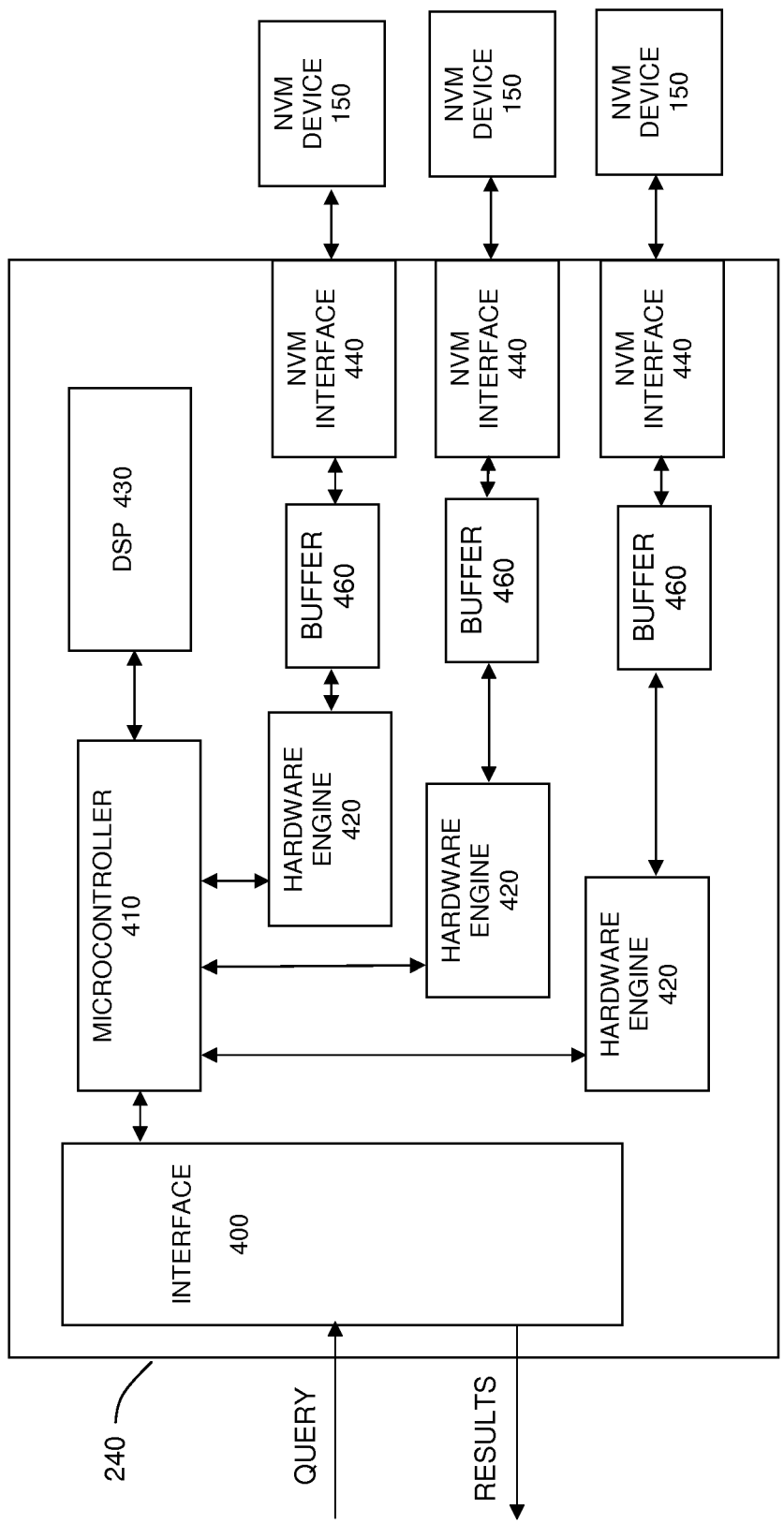
FIG. 7 depicts an exemplary block diagram of a processing unit of a solid state drive in communication with a server and a plurality of flash memories, in accordance with an embodiment of the present disclosure.

Referring to FIG. 7, in one embodiment of an SSD processing unit 240, the microcontroller 410 may be connected to a plurality of hardware engines 420, each of which may access a plurality of NVM devices 155 through a buffer 460 and a non-volatile memory (NVM) interface 440. This structure allows searches to be performed in parallel, resulting in shorter processing times (as illustrated in FIG. 6).

Figure 8:
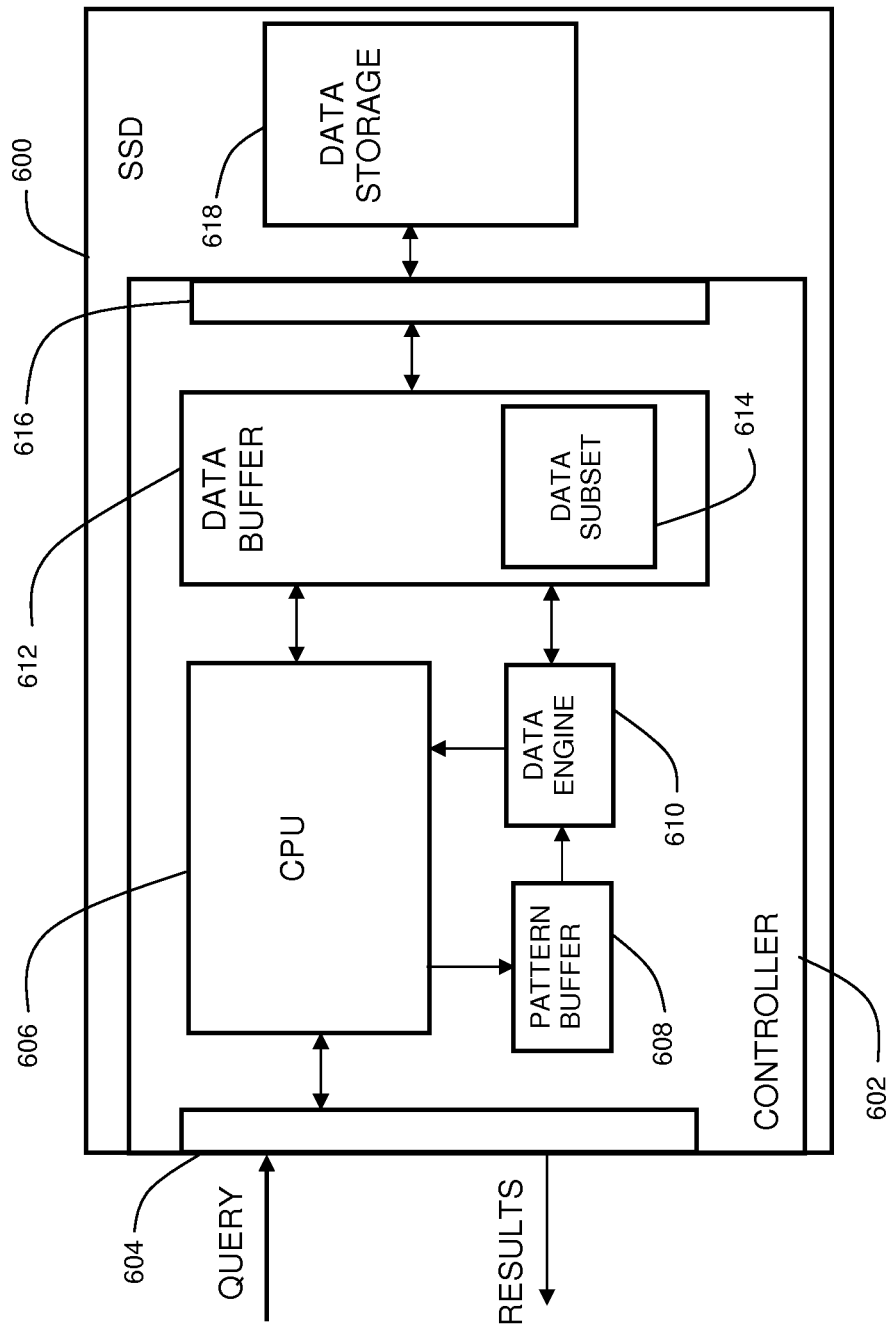
FIG. 8 is a block diagram of an embodiment of an SSD according to principles of the invention.

FIG. 8 is a block diagram of an SSD 600 according to one embodiment of the invention. The SSD 600 is configured to receive queries from a host computer, to process the queries, to perform operations on data stored in the SSD 600, and to return results.

The SSD 600 has a controller 602. The controller 602 has a host interface 604, a CPU 606, a pattern buffer 608, a data engine 610, a data buffer 612, and a data storage interface 616. The SSD 660 further includes a data storage 618. The controller 602 is designed for data operations or analytics. The host interface 604 receives data queries from a host computer. The host interface 604 is for example one of the technologies described above with regard to FIG. 4. The CPU 606 controls operations in the controller 602. The pattern buffer 608 and the data buffer 612 are memory elements for processing operations. The data engine 610 is a hardware implementation of a search engine or a pattern matching engine. The data storage interface 616 is an interface between the controller 602 and the data storage 618. The data storage 618 is a nonvolatile memory for data storage such as a flash memory.

In operation, the SSD 600 receives a data query at the host interface 604 of the controller 602. The data query is for example a request to find a text string such as a word, the number of occurrences of the text string in the stored data or the specific records in which the text string appears. In an alternative arrangement, the query is more complex and has information for requesting a search and a conditional search as described above.

The CPU 606 processes the query and loads the pattern buffer 612 with a pattern or patterns to be matched in a search of the data stored in the SSD 600. The pattern to be matched in this example is a word. The CPU 606 operates on the data buffer 612 to upload data from the data storage 618. The data uploaded from the data storage 618 is a small portion of data such as a data subset 614. The data may be read from the data storage 618 in or out of order. The data subset is laid out in order in the data buffer 612. As described above, data transfer between storage elements and between a data buffer and the storage element can be time, space and energy expensive. Loading small portions of data into the buffer saves on time, space and energy. The data engine 610 performs a search on the partial record in the data buffer 612 using the pattern stored in the pattern buffer 608. The data engine 610 may use one of a number of known string matching methods. The data engine 610 maintains a record of results of the search. The results are for example the number of occurrences of the word. Alternatively, the results are locations of the word such as whether the particular data set includes the word.

The data in the data storage 618 is searched in order. Accordingly, when the search of the partial record is completed, the CPU 606 operates to load a next small portion of data, in this case, the next piece of the data set. At the end of the search, the results are returned to the query originator, i.e., the host computer. In this way, data transfers between the host and the SSD are minimized.

Figure 9:
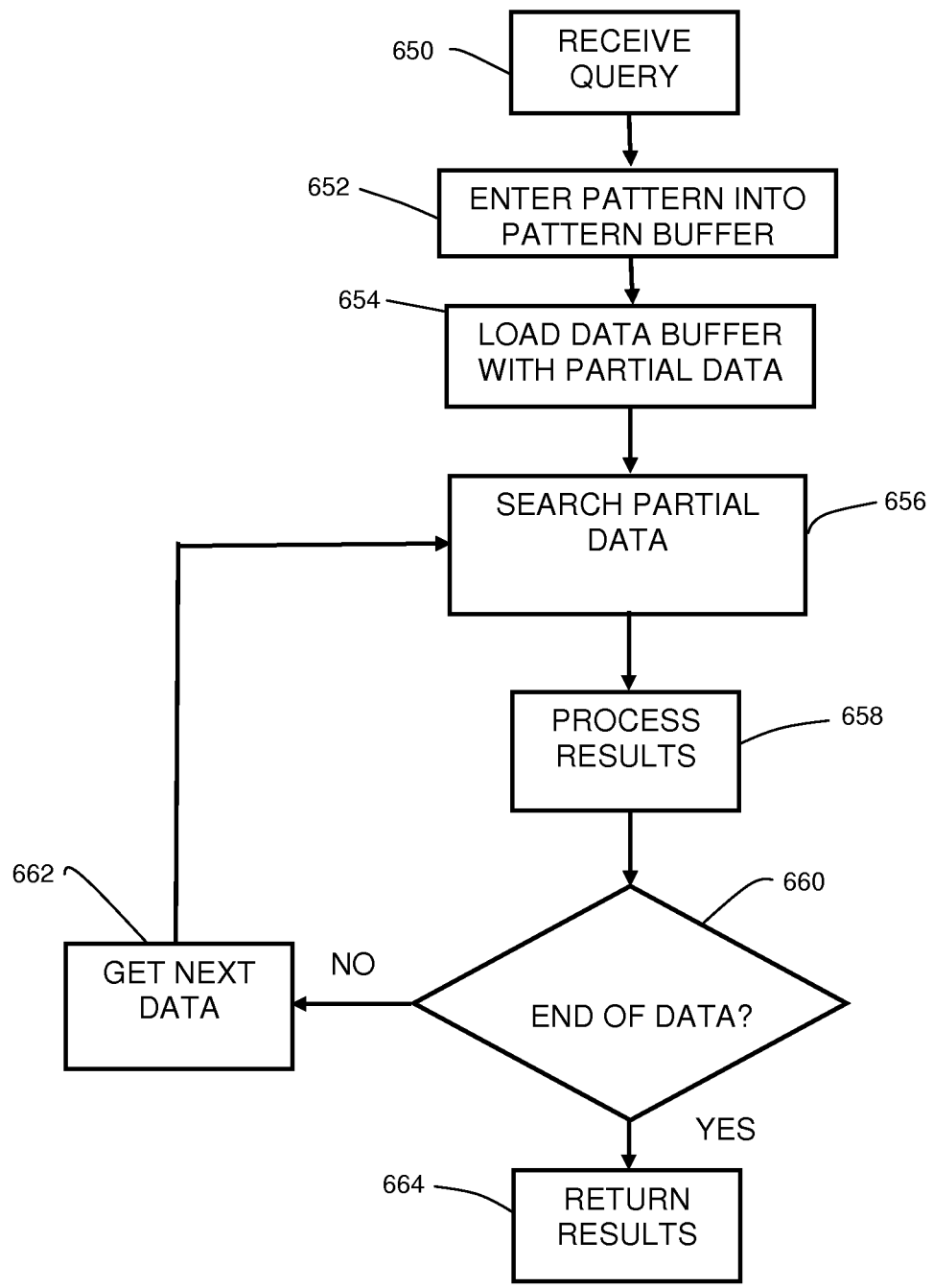
FIG. 9 is a flow chart of the operation of the SSD of FIG. 8.

FIG. 9 is a flow chart of the operation of an SSD, such as the SSD 600 described above.

At step 650, a query is received at the SSD 600. The query is processed in the processing unit to determine a pattern to be matched against the data stored in the SSD 600.

At step 652, the pattern is loaded into the pattern buffer.

At step 654, the processing unit accesses the data storage and loads the data buffer with partial data. As described above, the partial data is, for example, a data subset. The data uploaded from the data storage is laid out in order in the data buffer to facilitate the search.

At step 656, the data engine searches the partial data in the data buffer. The data engine, in a first embodiment, uses a string matching algorithm. The string matching algorithm further uses a rolling window comparison method. In an alternative embodiment, a more sophisticated search incorporates a conditional search as described above.

A first example string matching method used by the data engine is a simple search in which the data engine starts at the first position in the partial data. The number of bytes in the stored pattern determines the size of the window that the data engine uses. The data engine looks for a match between the first byte in the stored pattern and the first data position in the partial data. The data engine continues to attempt to match the byte in the stored pattern with the partial data until either a match is found or it is determine that there is no match at the first position. If no match is found at the first data position, the data engine begins again and moves the window to the second data position and searches as described above.

A second example string matching method uses some of the previous match information to make the search more efficient. In this example, the data engine first establishes a table based on the pattern in the pattern buffer. The data engine then looks for a match between the first byte in the stored pattern and the first data position in the subset data. If there is a match, the match is entered into the table and the data engine continues to the second byte in the pattern and the second position in the data. If the second byte matches, this is entered into the table. The data engine continues attempting to match the pattern and entering data into the table until either the pattern is matched or no match is found. In either case, the data engine uses the information stored in the table to proceed to move the window for matching to a next position in the subset data. This method is also known as the Knuth-Morris-Pratt method.

In an alternative string matching method, the pattern is made up of a number of characters and the solid-state drive performs matches using characters rather than bytes.

At step 658, the data engine processes the results of the search. The results may be the number of times that the word appears in the record or whether the word appears in the particular record.

At step 660, the data engine determines whether there is more data in the data storage to be searched. If there is unsearched data in the data storage, the controller accesses the data storage and loads the next data subset into the data buffer, step 662. The process then returns to step 656 and the newly loaded next data is searched. At step 660, if the data engine determines that there is no more data to be searched, the results are returned to the host computer, step 664.

In this process, the SSD minimizes the size of the data transfers between the storage and processing areas which provides speed and power advantages in the SSD operation.

Figure 10:
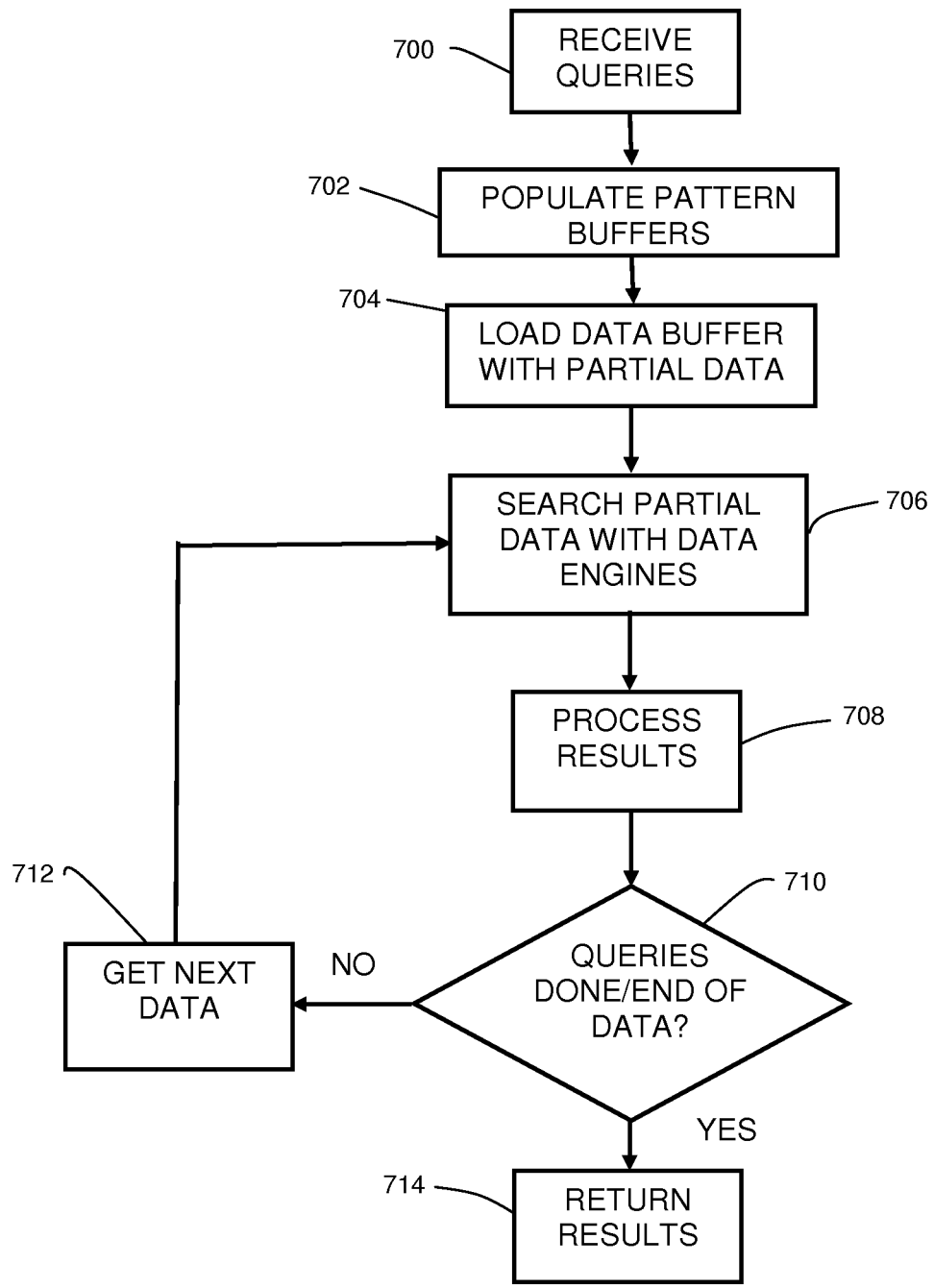
FIG. 10 is a flow chart of the operation of an alternative embodiment of an SSD according to principles of the invention.

FIG. 10 is a flow chart of the operation of an alternative embodiment of an SSD. In the alternative embodiment, the SSD has a plurality of pattern buffers and a plurality of data engines. This enables the SSD to accept and process a plurality of queries at the same time.

At step 700, a plurality of queries is received at the SSD. The queries are processed in the processing unit to determine the patterns to be matched against the data stored in the SSD. As described above with regard to FIG. 5, the queries may be received at different times and therefore while the processing unit is at different points in searching the data in the data storage.

At step 702, the various patterns from the received plurality of queries are loaded into the plurality of pattern buffers.

At step 704, the processing unit accesses the data storage and loads the data buffer with partial data. The partial data is, for example, a data subset.

At step 706, the data engines search the data subset. Each of the plurality of search engines is associated with one of the plurality of data buffers. Accordingly, each data engine performs a search on the data subset using the pattern stored in its associated data buffer.

At step 708, the data engines process the results of their searches.

At step 710, each data engine determines whether there is more data in the data storage to be searched with respect to its search. If there is no more data to be searched, the data engine is done and the controller performs step 764 and returns the results of that particular query. If there is more data to be searched with regard to the query, the process continues in step 762, where the controller accesses the data storage and loads the next data subset into the data buffer.

In this process, the SSD processes several queries and searches the data subset against the patterns from the several queries at the same time.

Figure 11:
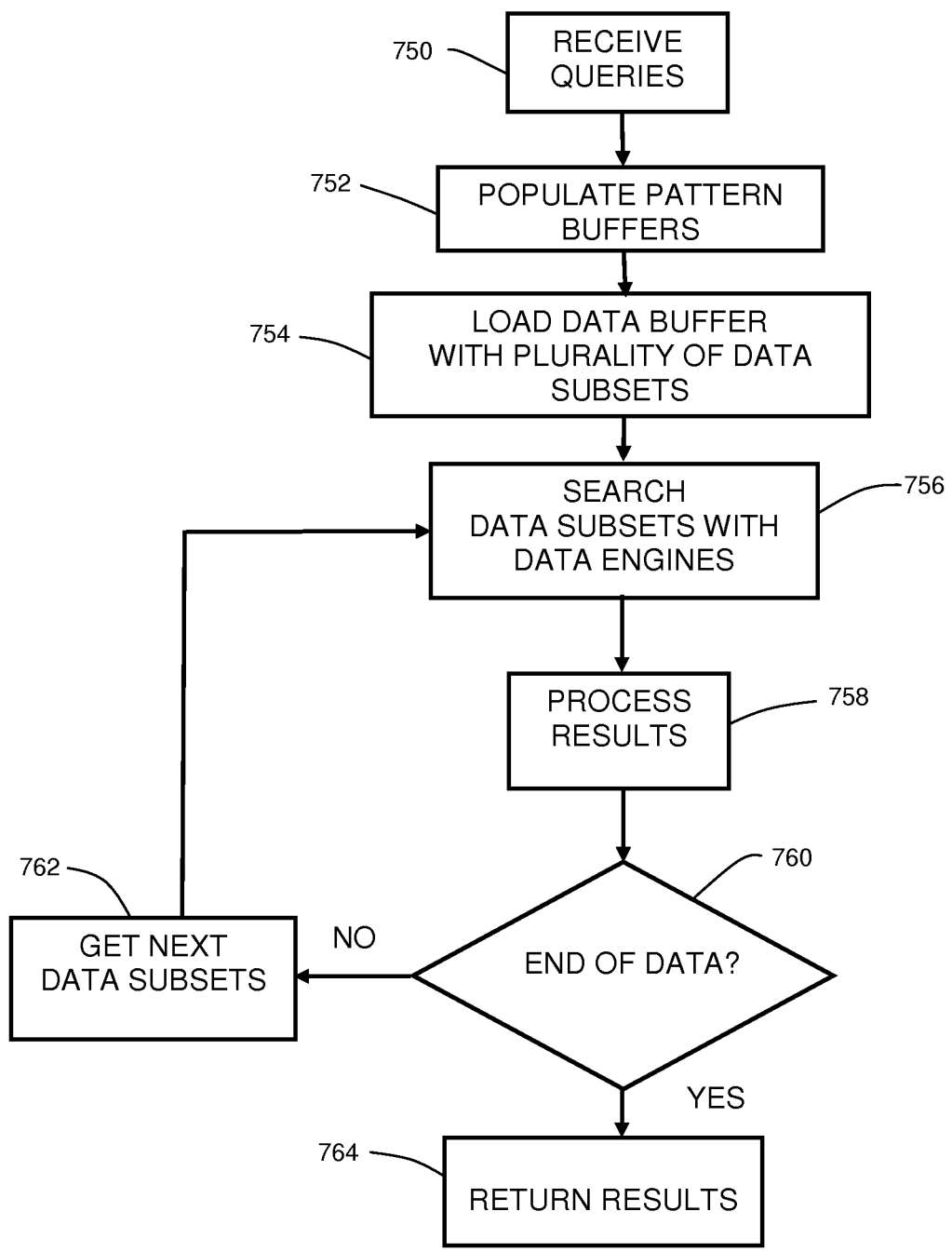
FIG. 11 is a flow chart of the operation of a further alternative embodiment of an SSD according to principles of the invention.

FIG. 11 is a flow chart of a further alternative embodiment of an SSD. In this embodiment, the SSD has a plurality of data buffers, a plurality of data engines where each data engine is associated with a data buffer. The data buffer is further configured to hold a plurality of data subsets.

At step 750, the SSD receives a plurality of queries. As with the process described above with regard to FIG. 10, the queries may be received at different times.

At step 752, the controller populates the pattern buffers with patterns to be matched from the plurality of queries.

At step 754, the controller accesses the data storage and loads the data buffer with a plurality of data subsets. The controller loads each data subset as a new query is received and processed. Each data subset is associated with a particular data engine and therefore a particular query.

At step 756, the data engines search the data subsets in the data buffer.

At step 758, the data engines process the results.

At step 760, each data engine determines whether there is any more data to be searched. If there is more data to be searched, the process proceeds to step 762. If there is no more data to be searched the process proceeds to step 764.

At step 762, the controller loads a next set of data subsets into the data buffer where each data subset is associated with a particular search engine. The process then returns to step 756.

At step 764, the data engine having completed a search of the data storage with respect to its associated query, then returns the results of the search based on that query.

In this process, queries are processed as a plurality of threads which enables the SSD to handle several queries at once as in the process described above but with the increased efficiency.

Figure 12:
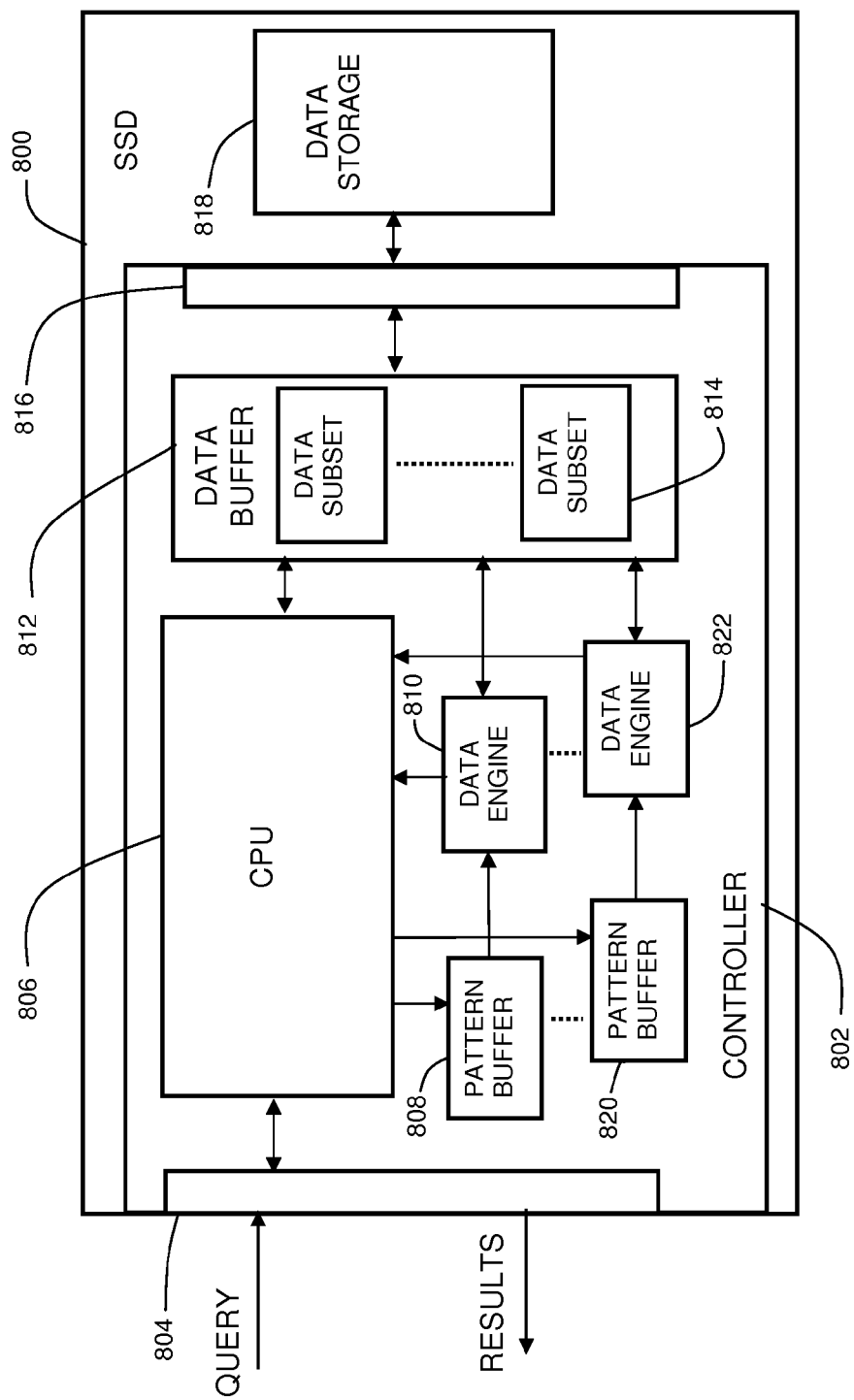
FIG. 12 is a block diagram of an alternative embodiment of an SSD according to principles of the invention.

FIG. 12 is a block diagram of an SSD 800 according to an alternative embodiment of the invention. The SSD 800 is configured to receive queries from a host computer, process the queries and perform operations on data stored in the SSD 800 and return results using a process such as that described with regard to FIG. 11.

The SSD 800 has a controller 802. The controller 802 has a host interface 804, a CPU 806, and a data storage interface 816. The processing unit further includes a plurality of pattern buffers illustrated by pattern buffer 808 and pattern buffer 820, a plurality of data engines illustrated by data engine 810 and data engine 822, a data buffer 812 configured to hold a plurality of data subsets 814. The SSD 800 further includes a data storage 818.

The controller 802 is designed for data operations or analytics. The host interface 804 receives data queries from a host computer. The host interface 804 is for example one of the technologies described above with regard to FIG. 4. The CPU 806 controls operations in the controller 802. The pattern buffers 808, 820 and the data buffer 812 are memory elements for processing operations. The data engines 810, 822 are hardware implementations of search engines or pattern matching engines. The data storage interface 816 is an interface between the controller 802 and the data storage 818. The data storage 818 is a nonvolatile memory for data storage such as a flash memory.

In operation, the SSD 800 receives data queries at the host interface 804 of the controller 802. Each data query is, for example, a request to find a text string such as a word, the number of occurrences of the text string in the stored data or the specific records in which the text string appears, however the query could be more complex as described above. The CPU 806 processes the queries and loads each pattern buffers, such as pattern buffer 808 and pattern buffer 820, with a pattern to be matched in a search of the data stored in the SSD 800. The CPU 806 operates on the data buffer 812 to upload data from the data storage 618. The CPU 806 uploads data subsets and each data set is associated with a data engine. The data uploaded from the data storage 818 are small portions of data such as data subsets. The data engine associated with the pattern buffer loaded with the pattern performs a search on the associated partial record in the data buffer 812. The data engine 810 may use one of a number of known string matching methods. The data engine 810 maintains a record of results of the search. The results are for example the number of occurrences of the word. Alternatively, the results are locations of the word such as whether the particular data set includes the word.

The data in the data storage 818 is searched in order. Accordingly, when the search of the partial record is completed, the CPU 806 operates to load a next small portion of data, in this case, the next piece of the data set. At the end of the search, the results are returned to the query originator, i.e., the host computer. In this way, data transfers between the host and the SSD are minimized.

APPLICATIONS

The disclosed systems and methods have many potential applications, including but not limited to data queries, data analytics, encryption and decryption. While the illustrations above relate to a query, a similar process may be performed, for example, in relation to data analytics, compression and decompression, and encryption and decryption.

There are many alternatives that can be used with these embodiments. For example, while solid state drives (SSDs) were discussed in examples above, any type of suitable memory device, such as a hard disk drive (HDD), can be used. Further, embodiments of the present invention may be used in a redundant array of independent disks (RAID) to achieve similar advantages in optimizing performance and resource utilization, while taking advantage of efficiencies in RAID parity calculations and the number of physical inputs and outputs (I/Os) performed. Accordingly, these embodiments can be used to make RAID controllers and subsystems more efficient.

Other embodiments are within the scope and spirit of the invention. For example, other string matching methods may be used. For example, the functionality described above can be implemented using software, hardware, firmware, hardwiring, or combinations of any of these. One or more computer processors operating in accordance with instructions may implement the functions associated with managing use of cache devices in accordance with the present disclosure as described above. If such is the case, it is within the scope of the present disclosure that such instructions may be stored on one or more non-transitory processor readable storage media (e.g., a magnetic disk, non-volatile random-access memory, phase-change memory or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein and equivalents thereof.

It is to be understood that the above-identified embodiments are simply illustrative of the principles of the invention. Various and other modifications and changes may be made by those skilled in the art which will embody the principles of the invention and fall within the spirit and scope thereof.

We claim:

1. A solid state drive comprising:
a host interface;
a processing unit; and
a flash memory, the flash memory storing a plurality of data sets;
the processing unit being in communication with the host interface, and the flash memory, the processing unit to receive a query through the host interface, and comprising:
a digital signal processing (DSP) core; and
a micro controller having a pattern buffer and a data engine;
the DSP configured to be controlled by the microcontroller, and:
to process the query to extract a pattern, to load the pattern into the pattern buffer, to access the flash memory, to create a window containing the pattern, to search a data subset from the flash memory for instances of the pattern using a rolling window method to search data subsets of the data sets in response to the query;
to process, using a processing algorithm, data received from the flash memory to form processed data and to generate a result from the search,
the processing unit configured to execute a search analysis on the processed data, the processed data comprising unstructured data, the search analysis comprising an analysis selected from the group consisting of:
comparing the processed data to a specified pattern in the window, wherein the comparing
comprises first testing the processed data with a first set of criteria, and second testing the processed data with a second set of criteria in response to the first testing only when the processed data meet the first set of criteria,
counting words in the processed data, wherein the counting comprises counting the number of occurrences of a word in the processed data,
performing in-line indexing of the processed data, and combinations thereof,
wherein the search analysis comprises the comparing of the processed data to the specified pattern, wherein the comparing comprises the first testing of the processed data with the first set of criteria, and the second testing of the processed data with the second set of criteria in response to the first testing only when the processed data meet the first set of criteria,
wherein the unstructured data comprises a header and a body,
wherein the first testing comprises first testing the header with the first set of criteria, and the second testing comprises second testing the body with the second set of criteria in response to the first testing only when the header meets the first set of criteria.

2. The solid-state drive of claim 1 wherein the pattern is made up of a number of bytes, the rolling window has a size, and the size of the rolling window is determined from the number of bytes.

3. The solid-state drive of claim 1 wherein the data engine positions the rolling window at a first data position in the data subset, the data engine compares data in the rolling window with the pattern byte by byte until a determination about matching is made and then the data engine moves the rolling window to a second data position in the data subset.

4. The solid-state drive of claim 1 wherein the data engine establishes a table based on the pattern in the pattern buffer and the data engine to use the table in positioning the rolling window in the data subset.

5. The solid-state drive in claim 1 wherein the processing unit receives a plurality of queries and searches one data subset at a time against the plurality of queries.

6. The solid-state drive in claim 1 wherein the controller receives a plurality of queries and searches a plurality of data subsets wherein each data subset is associated with one of the plurality of queries.

7. The solid-state drive in claim 1 wherein the micro controller further includes a CPU, a plurality of pattern buffers and a plurality of data engines wherein each data engine of the plurality of data engines is associated with one of the plurality of pattern buffers, wherein the micro controller receives a plurality of queries, and the CPU is configured to process each of the plurality of queries to extract patterns, to the load each extracted pattern into one of the plurality of pattern buffers, and the data engines search data subsets using the pattern from its associated pattern buffer.

8. A method of storing data in, and retrieving data from, a solid state drive comprising a host interface, and a flash memory, and a controller having a data engine and a pattern buffer, the method comprising:
receiving a query by the solid state drive;
storing a pattern derived from the query in the pattern buffer;
creating a window containing the pattern;
retrieving, by the solid state drive, data from the flash memory in response to the query;

processing, by the solid state drive, the retrieved data, using a processing algorithm including a rolling window, to generate processed data, the processed data being unstructured data, the processing algorithm comprising a first search analysis, the first search analysis comprising comparing the unstructured data to a specified pattern in a first rolling window, wherein the processing algorithm further comprises a second search analysis executed concurrently with the first search analysis, the second search analysis comprising comparing the unstructured data to a specified pattern in a second rolling window, wherein the first search analysis is on a header of the processed data, and the second search analysis is on a body of the processed data, and, generating search results.

9. The method of claim 8 wherein the pattern is made up of a number of characters, the method further comprising setting a size of the rolling window from the number of characters.

10. The method of claim 8 further comprising:

positioning the rolling window at a first data position in the partial data;

comparing the pattern with the data in the rolling window byte by byte until a determination about matching is made; and repositioning the rolling window at a second position in the partial data.

11. The method of claim 10 further comprising:
establishing a table based on the pattern;
entering search data into the table; and
positioning the rolling window using search data from the table.

12. The method of claim 8 further comprising:
receiving a plurality of queries by the solid state drive;
searching partial data from the data storage, by the controller, in response to the plurality of queries; and
generating results by the controller from the searching.

13. The method of claim 8 wherein the data storage stores a plurality of data sets and the partial data is a data subset.

14. The method of claim 13 wherein the searching step further comprises searching a plurality of data subsets.

15. The method of claim 8 wherein the controller further comprises a data buffer, wherein the data storage stores a plurality of data sets, wherein the partial data is a data subset, and wherein the method further comprises loading a data subset into the data buffer.

* * * * *